United States Patent [19]
Journée

[11] 3,969,784
[45] July 20, 1976

[54] PRESSION SECTOR WINDSCREEN-WIPER BLADE FOR MOTOR VEHICLES

[76] Inventor: Paul Journée, Chateau de Reilly, 60 Reilly par Chaumont-en-Vexin, France

[22] Filed: Jan. 30, 1975

[21] Appl. No.: 545,383

[30] Foreign Application Priority Data
Jan. 30, 1974  France .............................. 74.03099

[52] U.S. Cl. ............................................. 15/250.42
[51] Int. Cl.² ............................................. B60S 1/04
[58] Field of Search .................... 15/250.36–250.42

[56] References Cited
UNITED STATES PATENTS

| | | | |
|---|---|---|---|
| 2,634,446 | 4/1953 | Mackie et al. | 15/250.42 |
| 2,739,336 | 3/1956 | O'Shei | 15/250.42 |
| 2,859,468 | 11/1958 | O'Shei | 15/250.42 |
| 3,176,337 | 4/1965 | Glynn | 15/250.42 |
| 3,405,421 | 10/1968 | Tomlin | 15/250.42 |
| 3,816,870 | 6/1974 | Riester | 15/250.42 |
| 3,846,864 | 11/1974 | Baut et al. | 15/250.42 |

*Primary Examiner*—Peter Feldman
*Attorney, Agent, or Firm*—Bacon & Thomas

[57] ABSTRACT

The invention pertains to a windscreen-wiper blade of the type constituted by a large bridge on each end of which is articulated a bar or small bridge to hold a squeegee, wherein the contact between said bar and said squeegee occurs in a plurality of pressure zones.

4 Claims, 24 Drawing Figures

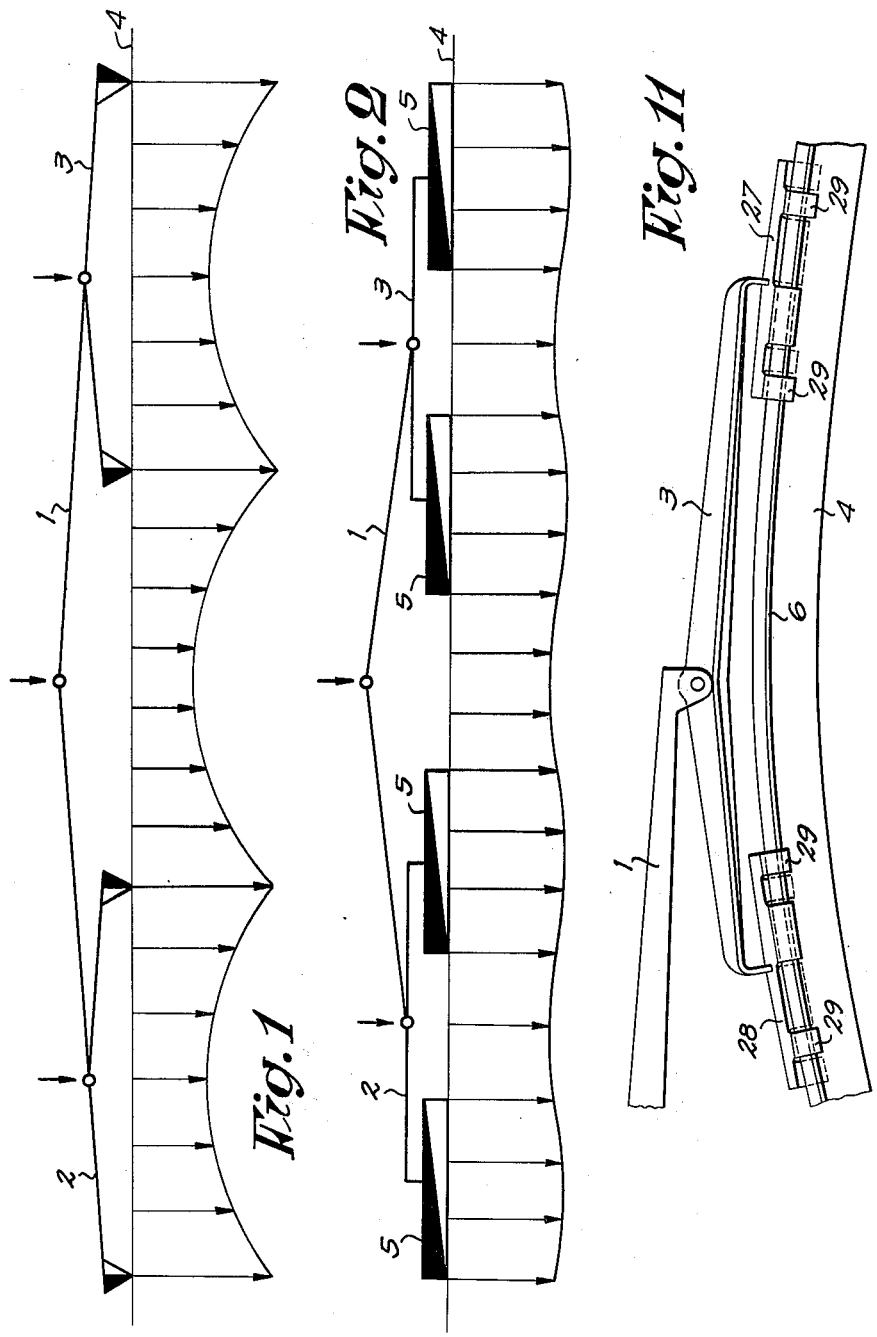

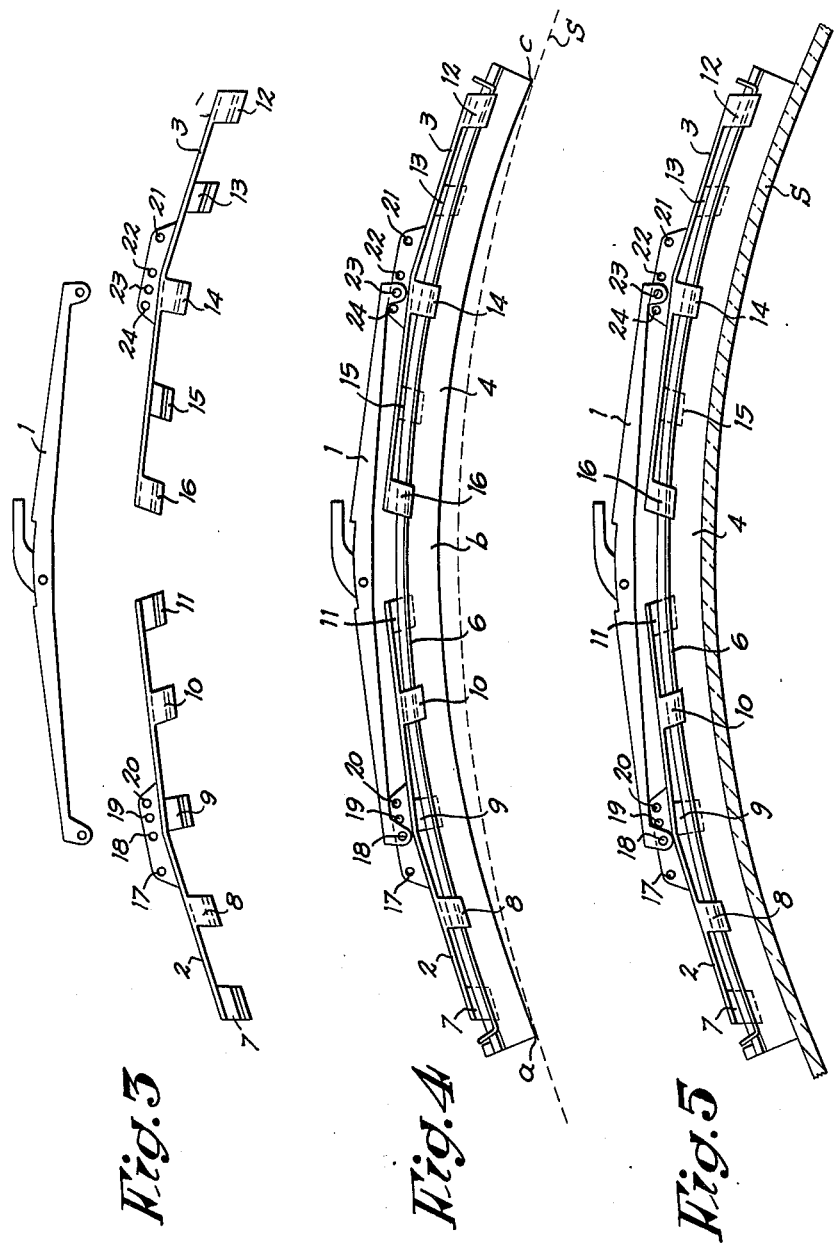

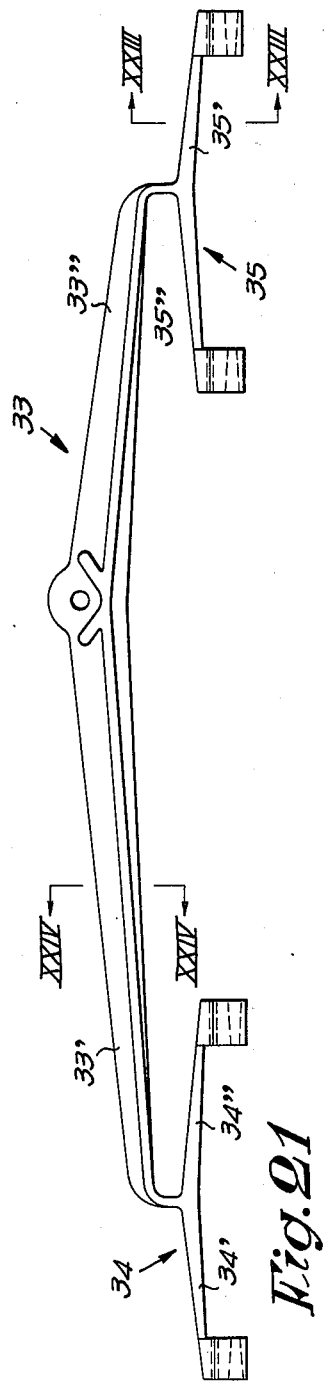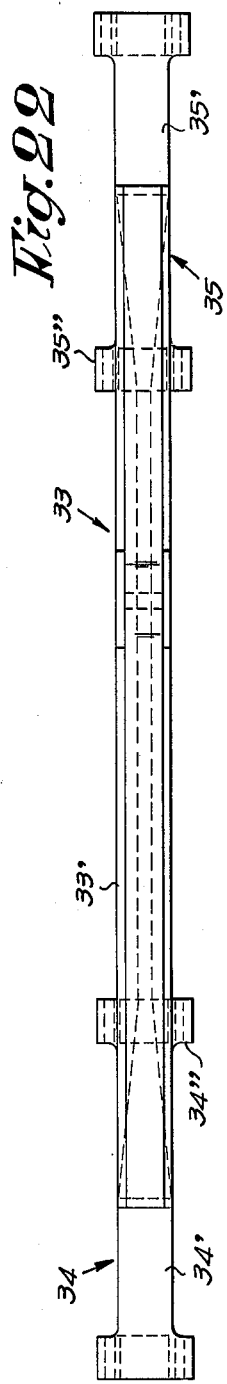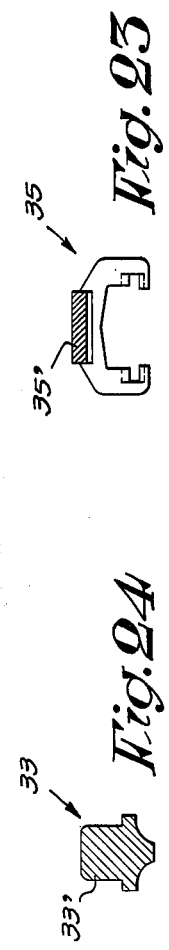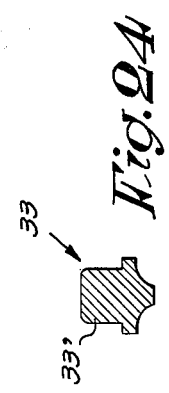

PRESSION SECTOR WINDSCREEN-WIPER BLADE FOR MOTOR VEHICLES

This invention concerns the manufacture of windscreen-wiper blades for motor vehicles. Obviously, numerous solutions have already been proposed with a view to ensuring maximum efficiency despite the sometimes considerable variations in the radius of curvature of the surfaces to be cleaned.

Seeking that efficiency has often caused other important aspects of this manufacture to be overlooked. More particularly, the purpose of the invention is not only to increase the efficiency of the windscreen-wiper blade by reason of the number of points of application of the frame on the squeegee but also, as regards manufacture, to attain maximum simplification and standardization, especially in the composition of different blade models. By the present invention it is possible, with one sole type of large bridge and one sole type of small bridge or bar, to ensure the construction of windscreen-wiper blades with a length varying from the value of two lengths of the small bridge to the maximum value given by the extreme axial position, including intermediaries.

These aims are attained by the fact that, according to the invention, the windscreen-wiper blade of the type composed substantially of a large bridge on each end of which is articulated a bar or small bridge, is characterized by the fact that contact between the said bar and the elastic strip is ensured by means of a plurality of pressure zones.

The said bars or small ridges are generally elastic. The relatively rigid large bridge and the relatively elastic bars or small bridges are mutually articulated, either by the oscillation axes or by means of an elastic bond.

These new characteristics can be employed in very different forms, by modifying the morphology and dimensions of the constituent parts. Also by choosing different materials suitable both for the relatively rigid large bridge and for the elastic bars or small bridges. The bonding means between the different pressure zones or points of the bars and the elastic scraping strip can also vary.

As an example, implementations are described in more detail below, without a restrictive nature, and referring to the appended drawings in which:

FIG. 1 represents schematically the distribution of thrust effects on the elastic strip in a conventional windscreen-wiper blade;

FIG. 2 represents schematically the position of thrust effects on the elastic strip in a windscreen-wiper blade according to the invention;

FIG. 3 is an exploded view of the constituent parts of a windscreen-wiper blade frame according to the invention;

FIG. 4 represents, assembled, a windscreen-wiper blade applying the elements of FIG. 3;

FIG. 5 represents a windscreen-wiper blade according to the invention applied against a surface to be cleaned;

FIG. 11 is similar to FIG. 10 but refers to a curved windscreen-wiper blade;

Figure 6:
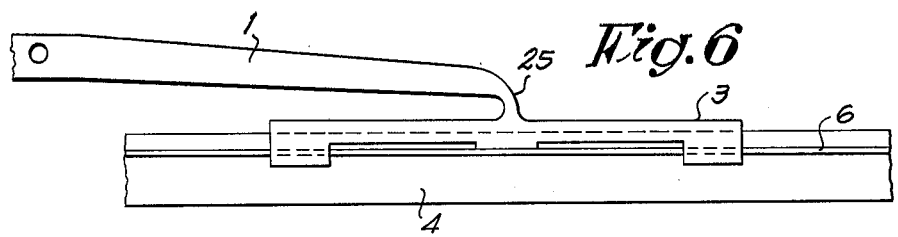
FIG. 6 represents a front view of part of a rectilinear windscreen-wiper blade according to the invention.

FIGS. 12 to 20 schematize briefly different possible implementations of the windscreen-wiper blade according to the invention;

FIG. 21 represents a front view of a practical execution in one sole piece;

FIG. 22 is a plane view of it;

FIGS. 23 and 24 represent, respectively, a section along lines XXIII—XXIII and XXIV—XXIV of FIG. 21.

As schematized in FIG. 1, in conventional windscreen-wiper blades where the bearing surfaces between the frame and the elastic strips are ensured by point or linear contacts, the pressure effort distribution is such that the attraction stresses of the elastic strip are extremely variable in each section delimited by successive bearing surfaces. On the contrary, as shown in FIG. 2, the windscreen-wiper blade device according to the invention ensures an appreciably more regular distribution over the whole length of the elastic strip.

A large or primary bridge member 1 on both ends of which is articulated a bar or small or secondary bridge member, respectively 2-3, is represented symbolically in the two schematic representations of FIGS. 1 and 2. In the FIG. 1 example, the localized contacts between the said bars 2-3 and the elastic strip schematized in 4 are effected with the intervention of extremely small surfaces. In the schematic representation of FIG. 2, the bars or little bridges 2-3 rest on the elastic strip schematized in 4 in such a way that contact is effected by the intermediary of zones 5.

It is thus possible to distribute the thrust effect over the whole length of the elastic strip 4 which is represented by the FIG. 2 diagram.

In the pressure zones, the number of contact surfaces is variable.

In the execution of FIGS. 3, 4 and 5, the windscreen-wiper blade-holder according to the invention is constituted by a large, rigid bridge 1 on each end of which is articulated an elastic or flexible bar or small bridge, respectively 2-3. These rest on the elastic strip 4 which is strengthened in a known manner by one or more metal bands 6, with the intervention of a plurality of pressure zones or points, respectively 7 to 11 and 12 to 16. The said small bridges or bars 2-3, in the rest position, are slightly curved so that, in this position, the elastic strip 4 delimits a concave curve, to which end the said pressure zones or points 7 to 16 are spread out along a curve a-b-c which will generally be different from the curve of the surface to be wiped S. In this same implementation, the small bridges or bars 2-3 present, about in their middle, a plurality of holes, respectively 17 to 20 and 21 to 24.

By adequate combination of the large bridge 1 and the small bridges or arms 2-3, the range of the two-bar unit can be varied so as to obtain a length varying from the value of two lengths of a small bridge or bar to the maximum value corresponding to the extreme axial position.

It will be observed that in this windscreen-wiper blade, despite the numerous variants that are possible in regard to the relative position of the pressure zones or poins 7 to 16, only two different parts are used, conforming respectively to the large bridge 1 and the small bridges or bars 2-3 which are identical.

The large bridge 1 will generally be made of metal so as to possess good rigidity; whereas the small bridges or bars 2-3 will be made of a relatively elastic or flexible matter, either of spring steel or a synthetic material.

If the large bridge is made of plastic, the chosen substance must possess more rigidity than that used to make the small bridges or bars 2-3.

Figure 7:
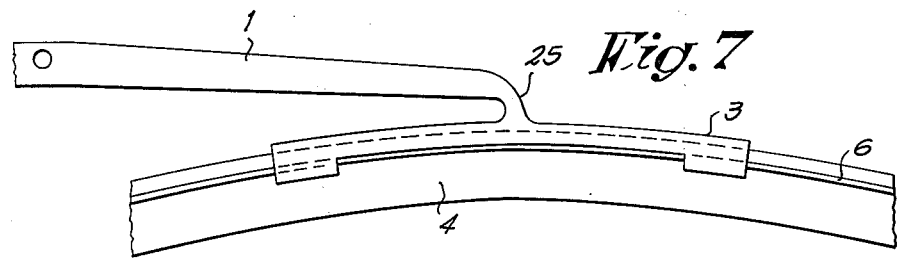
FIG. 7 is similar to FIG. 6 and refers to a curved windscreen-wiper blade.

In the implementation in FIGS. 6 and 7, the bar 2 has been cast in one sole piece with the large bridge 1. In the junction zone 25, the thickness of the matter may be reduced so as to obtain good elasticity or flexibility in the joint thus made.

Figure 8:
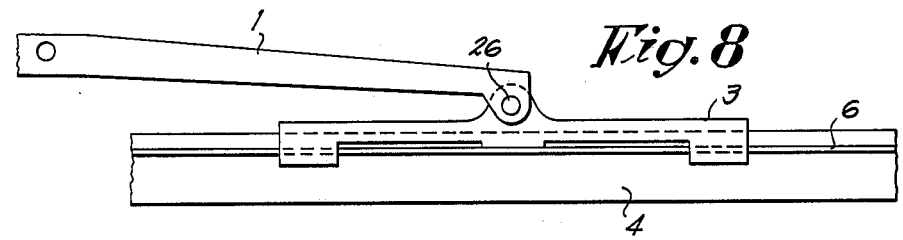
FIG. 8 represents a front view of a variant of FIG. 6.
Figure 9:
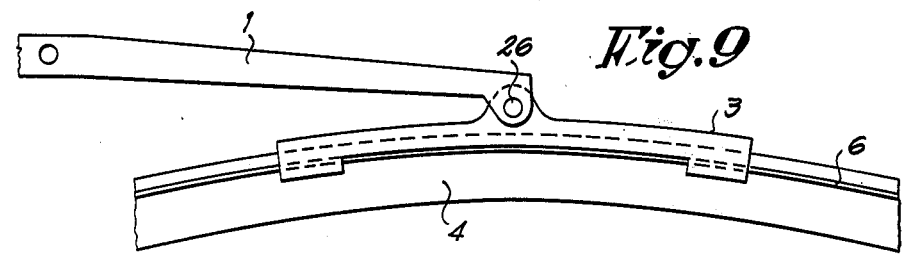
FIG. 9 is similar to FIG. 8 but refers to a curved windscreen-wiper blade.

FIGS. 8 and 9 show implementations similar to those in FIGS. 6 and 7, but the joint between bar 2 and large bridge 1 is effected in the conventional manner by a pivoting pin 26.

Figure 10:
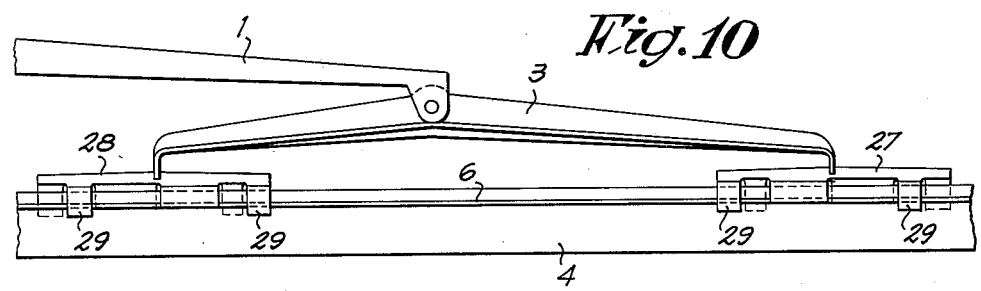
FIG. 10 represents a front view of a second variant of the implementation in FIG. 6.
Figure 12:
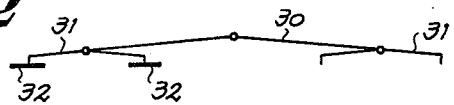
Figure 13:
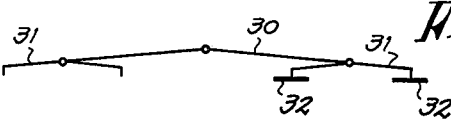
Figure 14:
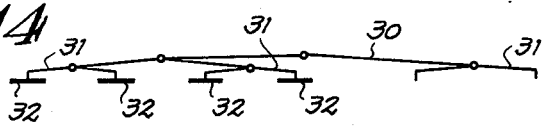
Figure 15:
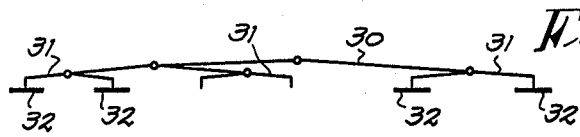
Figure 16:
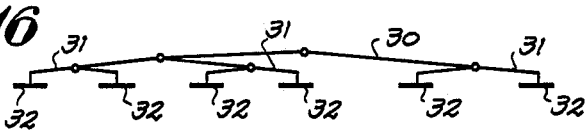
Figure 17:
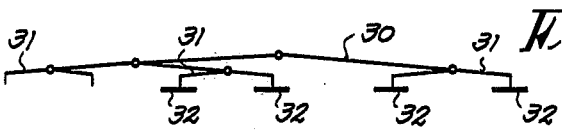
Figure 18:
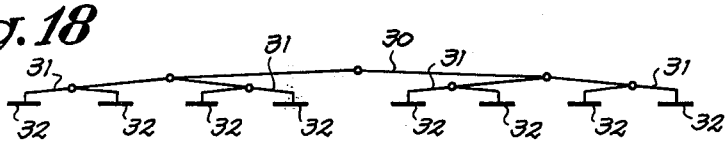
Figure 19:
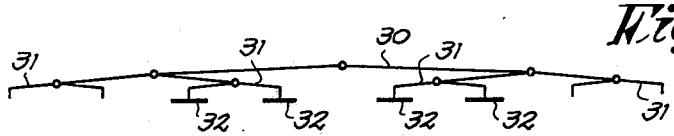
Figure 20:
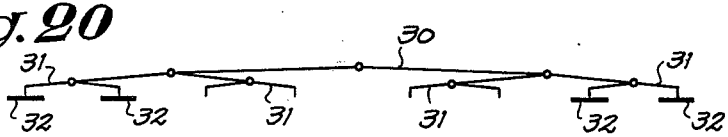

The implementations represented in FIGS. 10 and 11 show the large bridge 1, the bars 2 and, connected to both ends of the said bars, a multiple bearing zone element, respectively 27-28.

These elements consist of small plates with lateral tongues 29 by means of which a plurality of extremely effective pressure zones are delimited. These small plates should preferably come from the works with the bars or small bridges.

As an indication, in FIGS. 12 to 20 numerous different combinations are represented in which are systematically found one large bridge 30, small bridges or bars 31 and pressure zones 32; all these implementations can apply one or more of the characteristic arrangements described above.

In the implementation shown in FIGS. 21 to 24, the large bridge 33 and the small bridges or bars 34-35 are made in one sole piece, generally of plastic. In this implementation, the two branches 33' and 33'' of the large bridge are of unequal length; similarly the sections 34'-34'' and 35'-35'' of the small bridges, respectively 34 and 35, are of unequal length. In the event, the longer sections, respectively 34'' and 35'' are directed towards each other, i.e. towards the inside of the device.

It goes without saying, of course, that the number of pressure zones or points is variable.

Naturally, various modifications can be made by a craftsman to the devices or processes which have just been described as non-limitative examples, without going beyond the scope of the invention.

What I claim is:

1. In a windshield wiper blade assembly having a primary bridge member, a secondary bridge member pivotally mounted on each end of said primary bridge member and a flexible wiper member engaging each of said secondary bridge members at a plurality of spaced zones, the improvement comprising:

said primary bridge member being substantially rigid;

each of said secondary bridge members being of a unitary single structure and being resiliently bendable in a plane containing all said bridge members;

means fixed on said secondary bridge members defining at least three of said pressure zones longitudinally spaced along each of said secondary bridge members; and said pressure zones of each of said secondary bridge members, when said bridge members are unstressed and at rest, being relatively arranged to each other to cause said wiper member to define a curve concave on the side thereof facing away from said bridge member.

2. A windshield wiper blade assembly as defined in claim 1 wherein said secondary bridge members are of spring steel.

3. A windshield wiper blade assembly as defined in claim 1 wherein said secondary bridge members are of elastically bendable synthetic material.

4. A windshield wiper blade assembly as defined in claim 1 wherein said secondary bridge members are pivotally mounted on said primary bridge member by pivot means engaging a selected one of a plurality of pivot holes spaced apart along said secondary bridge members.

* * * * *